US012322912B2

(12) United States Patent
O'Connell et al.

(10) Patent No.: US 12,322,912 B2
(45) Date of Patent: Jun. 3, 2025

(54) PLUG COUNT LIMITER FOR CABLES

(71) Applicant: INTERNATIONAL BUSINESS MACHINES CORPORATION, Armonk, NY (US)

(72) Inventors: Kevin O'Connell, Rochester, MN (US); Timothy Clyde Buchholtz, Rochester, MN (US); George Russell Zettles, IV, Rochester, MN (US); Karl Erickson, Rochester, MN (US); George Paulik, Rochester, MN (US); Jarrett Betke, Rochester, MN (US); Timothy Lindquist, Rochester, MN (US); Daniel Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 18/178,690

(22) Filed: Mar. 6, 2023

(65) Prior Publication Data

US 2024/0305049 A1 Sep. 12, 2024

(51) Int. Cl.

| | |
|---|---|
| ***H01R 24/38*** | (2011.01) |
| ***H01R 13/502*** | (2006.01) |
| ***H01R 13/627*** | (2006.01) |
| ***H01R 13/629*** | (2006.01) |
| ***H01R 13/641*** | (2006.01) |

(52) U.S. Cl.

CPC ........... *H01R 24/38* (2013.01); *H01R 13/502* (2013.01); *H01R 13/627* (2013.01); *H01R 13/629* (2013.01); *H01R 13/641* (2013.01)

(58) Field of Classification Search

CPC .... H01R 24/38; H01R 13/502; H01R 13/627; H01R 13/629; H01R 13/641; H01R 13/64; H01R 13/6397; H01R 2103/00; H01R 24/40; G06M 1/086; G06M 3/02

See application file for complete search history.

(56) References Cited

U.S. PATENT DOCUMENTS

| | | | | |
|---|---|---|---|---|
| 5,456,611 A * | 10/1995 | Henry | ................ | H01R 13/6395 439/578 |
| 7,075,023 B2 | 7/2006 | Kent | | |
| 7,273,992 B2 | 9/2007 | Kent | | |
| 7,321,313 B1 | 1/2008 | Inlow | | |

(Continued)

FOREIGN PATENT DOCUMENTS

| | | |
|---|---|---|
| EP | 3069414 B1 | 7/2018 |

*Primary Examiner* — Abdullah A Riyami
*Assistant Examiner* — Nader J Alhawamdeh
(74) *Attorney, Agent, or Firm* — Stosch Sabo

(57) ABSTRACT

A cable connector for counting a number of plug-in events and preventing further plug in attempts after a threshold number of plug-in events have occurred. An inner sleeve is located inside an outer sleeve, and is designed to move relative to the outer sleeve. The inner sleeve further includes a tab on an outer surface of the inner sleeve. A gear wheel is located inside the outer sleeve and perpendicular to the inner sleeve and has a number of gear teeth. A toggle plug counter rotates the gear wheel one tooth in response to a plug-in action of the cable counter. When the gear wheel rotates to a point where the tab aligns with a notch in the gear wheel an inner spring at the opposite end of the inner sleeve causes the inner sleeve to move through the gear wheel such that further plugging action becomes difficult.

20 Claims, 11 Drawing Sheets

(56) References Cited

U.S. PATENT DOCUMENTS

| | | | | |
|---|---|---|---|---|
| 7,435,112 | B1 | 10/2008 | Miller | |
| 7,758,369 | B2 | 7/2010 | Miller | |
| 7,770,048 | B2 | 8/2010 | Aksamit | |
| 9,620,898 | B2 | 4/2017 | Kloppenburg | |
| 9,762,006 | B2 * | 9/2017 | Endo | H01R 43/16 |
| 10,665,995 | B2 | 5/2020 | Strong | |
| 2015/0316087 | A1 * | 11/2015 | Hyzin | H01R 13/622 403/327 |
| 2021/0132302 | A1 * | 5/2021 | Wong | H01R 13/6272 |
| 2024/0305049 | A1 * | 9/2024 | O'Connell | H01R 13/502 |

* cited by examiner

PLUG COUNT LIMITER FOR CABLES

BACKGROUND

The present disclosure relates to cable connectors, and more specifically, to counting a number of plug-in events prior to disabling the ability of the connector to be used again.

Input-output connectors are interfaces for linking devices using cables. They generally have a plug end with one or more pins protruding from it. This plug end connector is meant to be inserted into a socket that includes holes for accommodating the pins. These are commonly found in many different scenarios. For example, cables connectors can be found on personal computer, mobile phones, servers, and other devices where communications between components is desired. Many of these connections are sensitive to the quality of the connection. With frequent plugging and unplugging the risk of a failure or degradation of the connection and/or connector can occur. While it is possible to estimate when a failure might occur, it is difficult to know how close the connector is to that failure point. This results in unexpected failures of systems and downtime associated with the repair and replacement of the cable.

SUMMARY

According to embodiments of the present disclosure, a cable connector that is configured for counting a number of plug-in events and then preventing further plug-in attempts after a threshold number of plug-in events have occurred. The cable connector includes an outer sleeve, an inner sleeve, a gear wheel, and a toggle plug counter. The inner sleeve is located inside the outer sleeve, and is designed to move relative to the outer sleeve. The inner sleeve further includes a tab on an outer surface of the inner sleeve. The gear wheel is located inside the outer sleeve and perpendicular to the inner sleeve. The gear wheel has a plurality of gear teeth that count the number of plug-in events and allow the gear wheel to rotate. A toggle plug counter is provided to rotate the gear wheel one tooth in response to a plug-in action of the cable counter. When the gear wheel rotates to a point where the tab of the inner connector sleeve aligns with a notch in the gear wheel an inner spring at the opposite end of the inner sleeve causes the inner sleeve to move through the gear wheel such that further plugging action becomes difficult.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
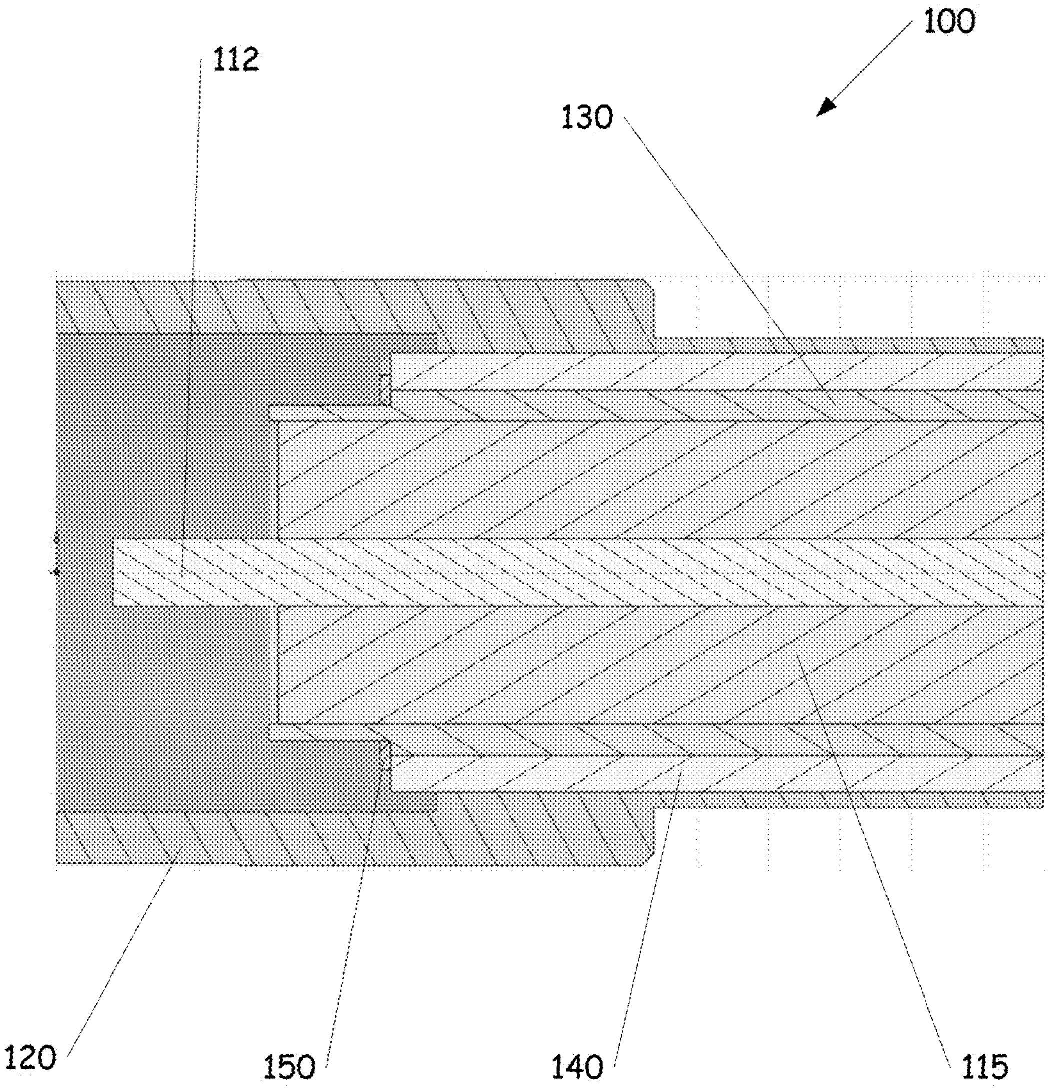
FIG. 1 is a cross sectional view of a cable connector in the retracted position according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cable connectors, more particular aspects relate to counting a number of cable plug-in events and preventing further plugging once a threshold number of plug-in events have occurred. While the present disclosure is not necessarily limited to such applications, various aspects of the disclosure may be appreciated through a discussion of various examples using this context.

SMA connectors define a durability mechanical specification that indicate the number of mating cycles, or how many times a connection can be made prior to wearing out. This is typically for brass connectors about a minimum of 100 cycles, and for stainless steel connectors around a minimum of 500 cycles. However, for certain types of high-speed cables the number of mating cycles can be far less, such as between 20-25 insertions before wearing out. The number of mating cycles is important because wear out can manifest itself as a change in the connection resistance. This can result in signal integrity issues that can be especially pernicious and troublesome. In applications that require reliable cabling, such as quantum computers, the finite limit of mating cycles adds an unwanted variable as there generally isn't a definitive indication or warning of an impending failure of the cable. The present disclosure provides an approach to mechanically count the number mating cycles for SMA connectors, and prevent the operator from exceeding a predetermined number of plugging events. It should be noted that the present disclosure can also be used on other types of cabling connectors where mechanical wear out of the connector is a problem.

Figure 2:
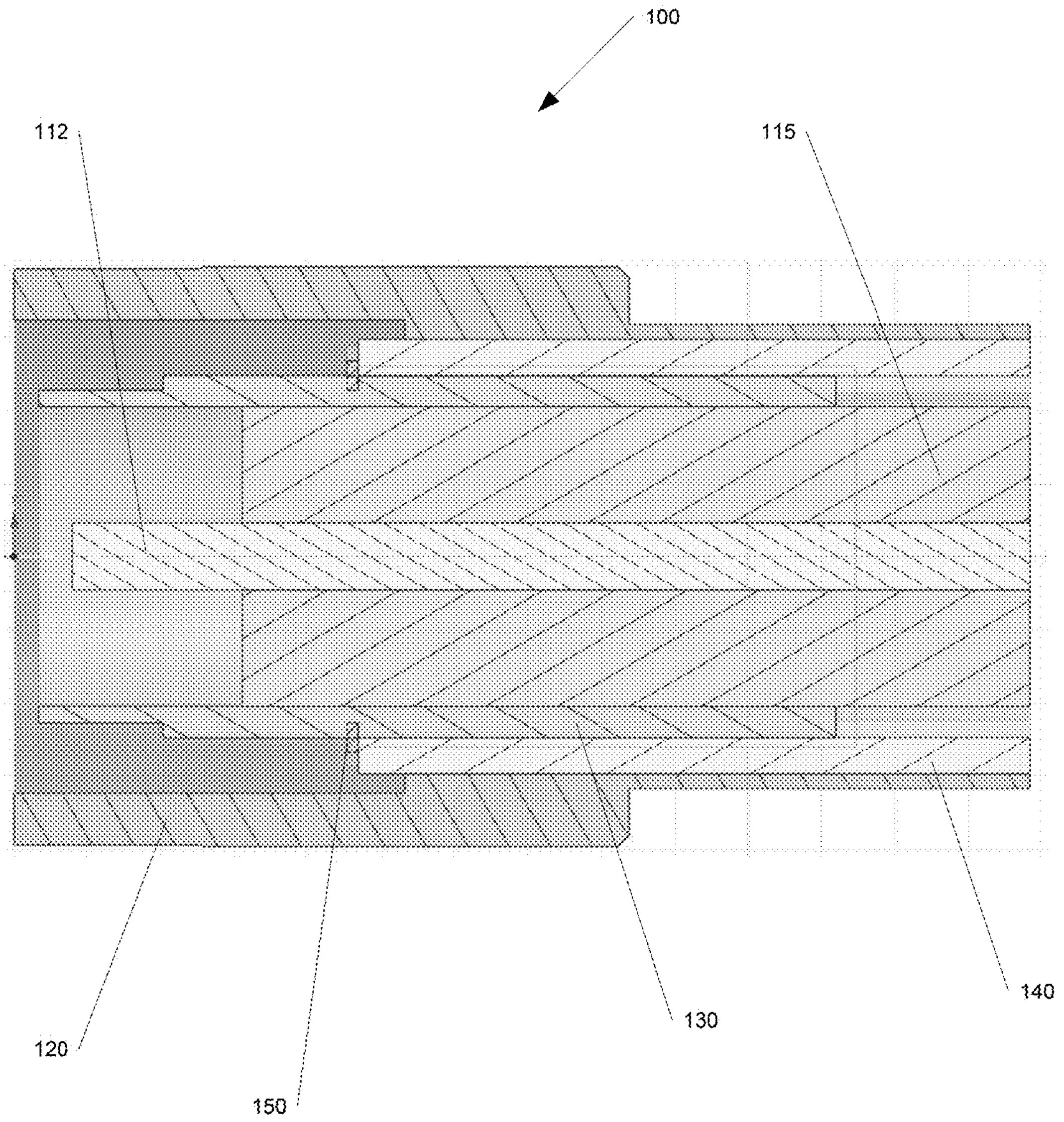
FIG. 2 is a cross-sectional view of the cable connector in the blocking position according to embodiments of the present disclosure.
Figure 3:
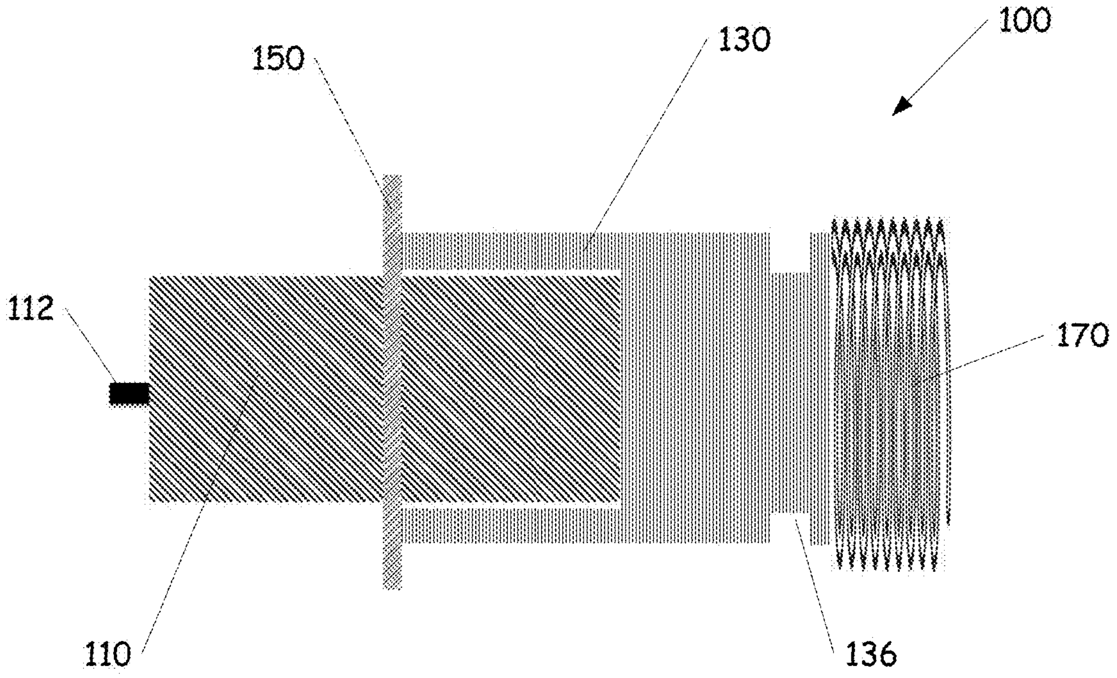
FIG. 3 is a simplified cross-sectional view of the cable connector in the retracted position, with the outer sleeve removed, according to embodiments of the present disclosure.
Figure 4:
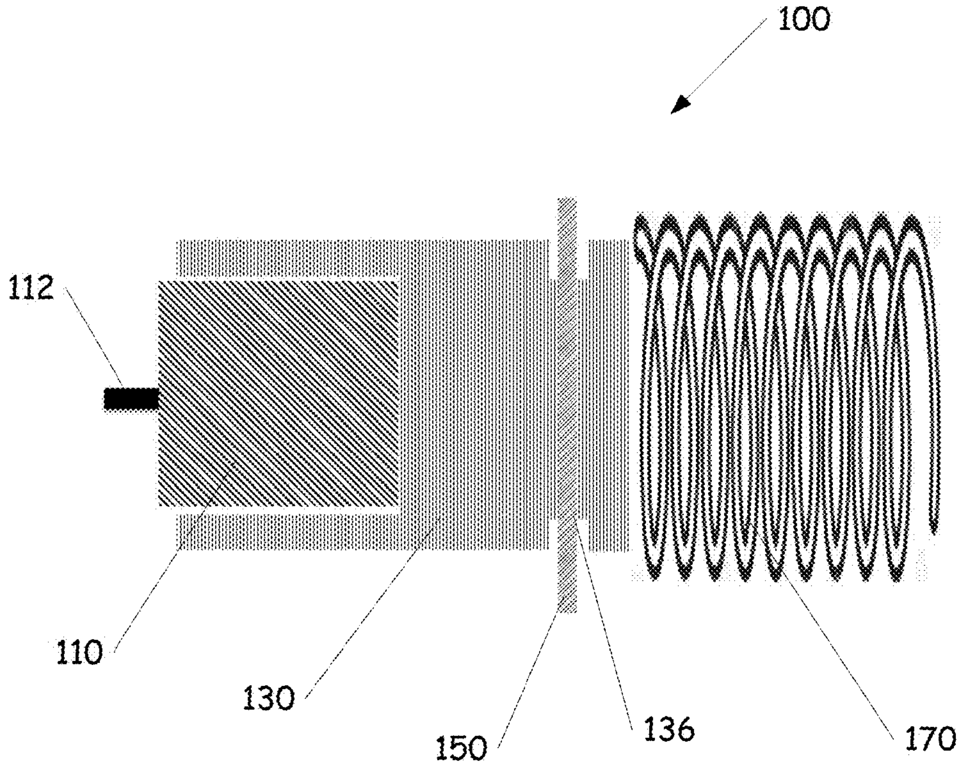
FIG. 4 is a simplified cross-sectional view of the cable connector in the blocking position, with the outer sleeve removed, according to embodiments of the present disclosure.
Figure 5:
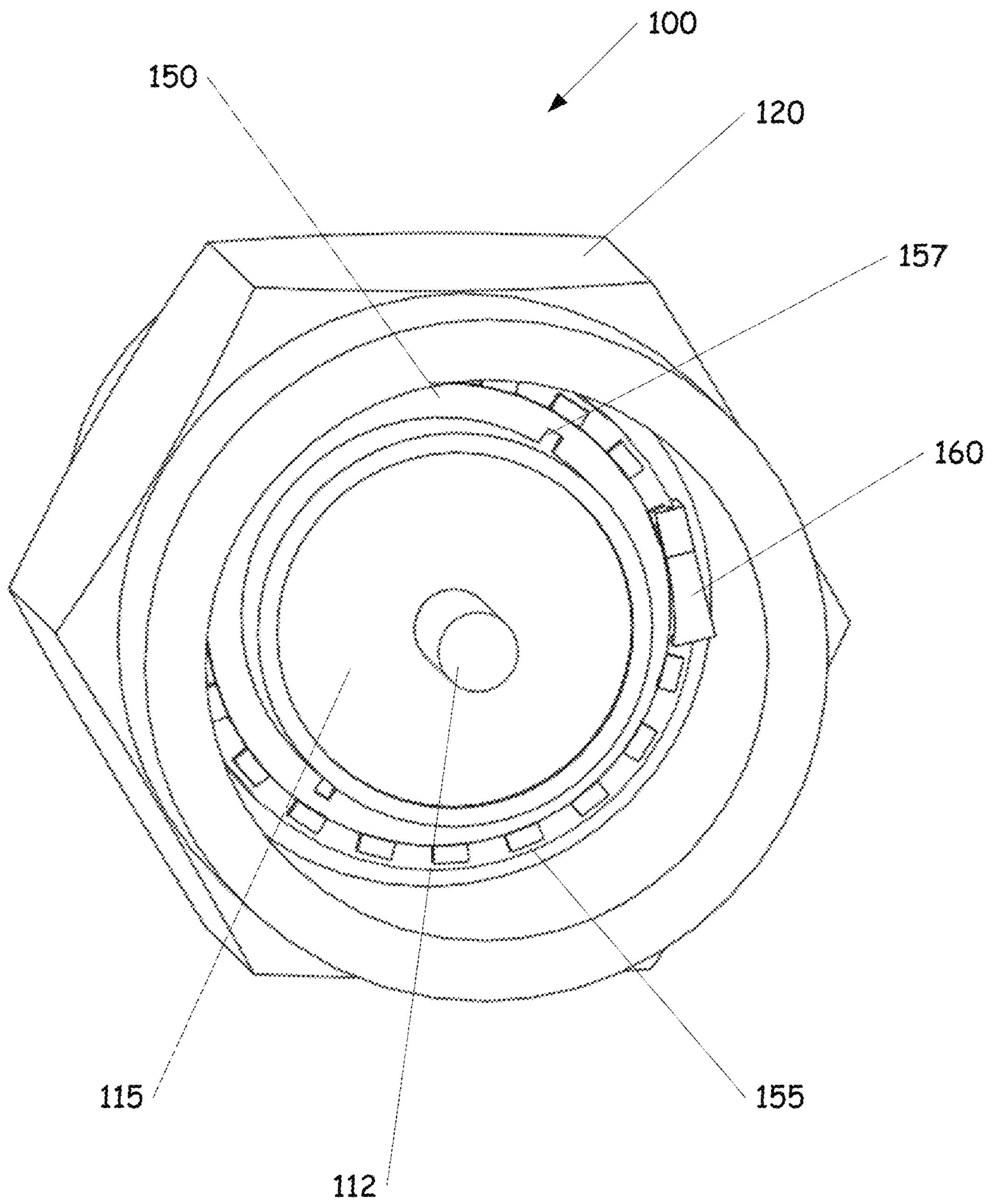
FIG. 5 is a perspective view of the cable connector in the retracted position according to embodiments of the present disclosure.
Figure 6:
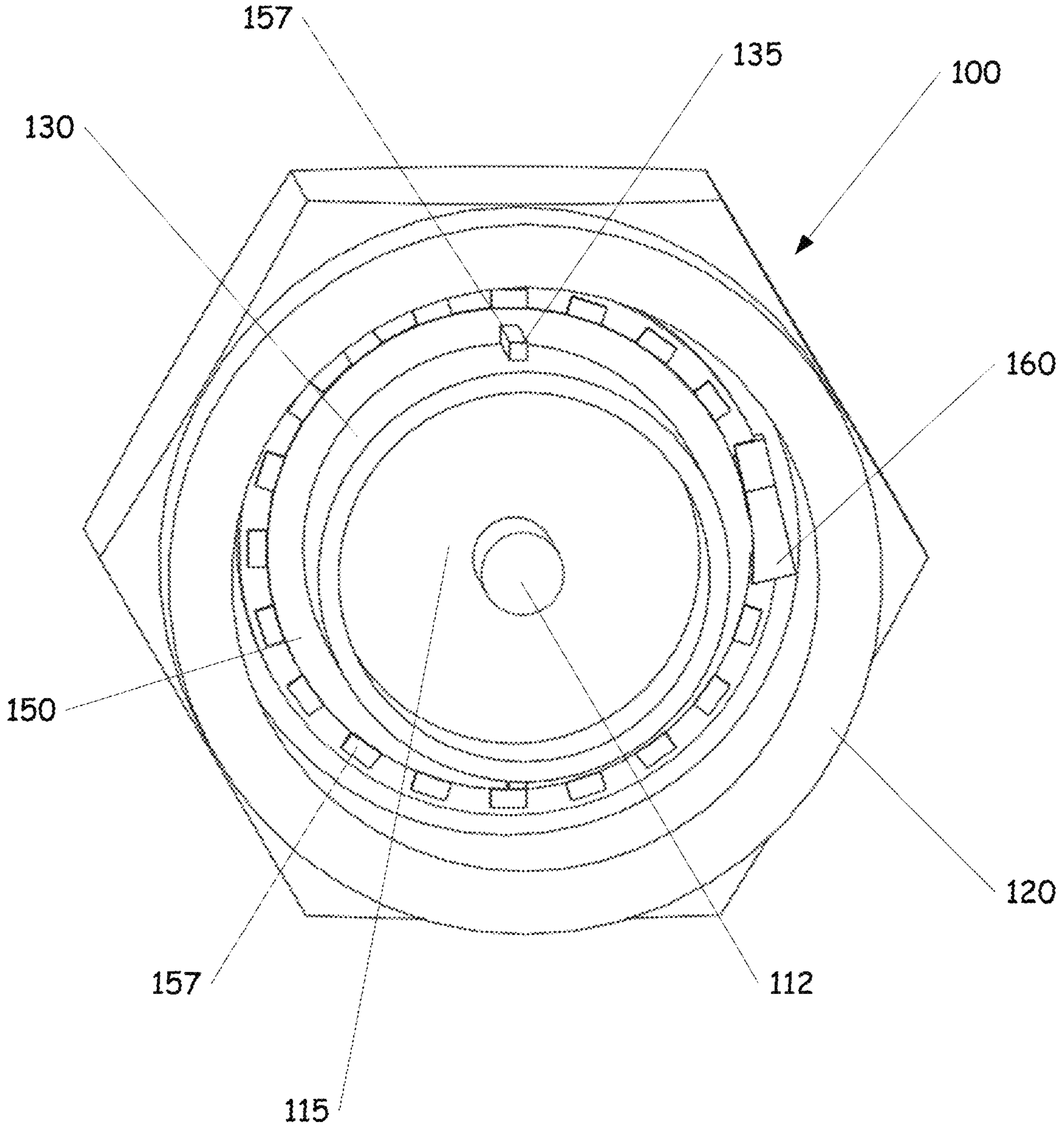
FIG. 6 is a perspective view of the cable connector in the blocking position according to embodiments of the present disclosure.
Figure 7:
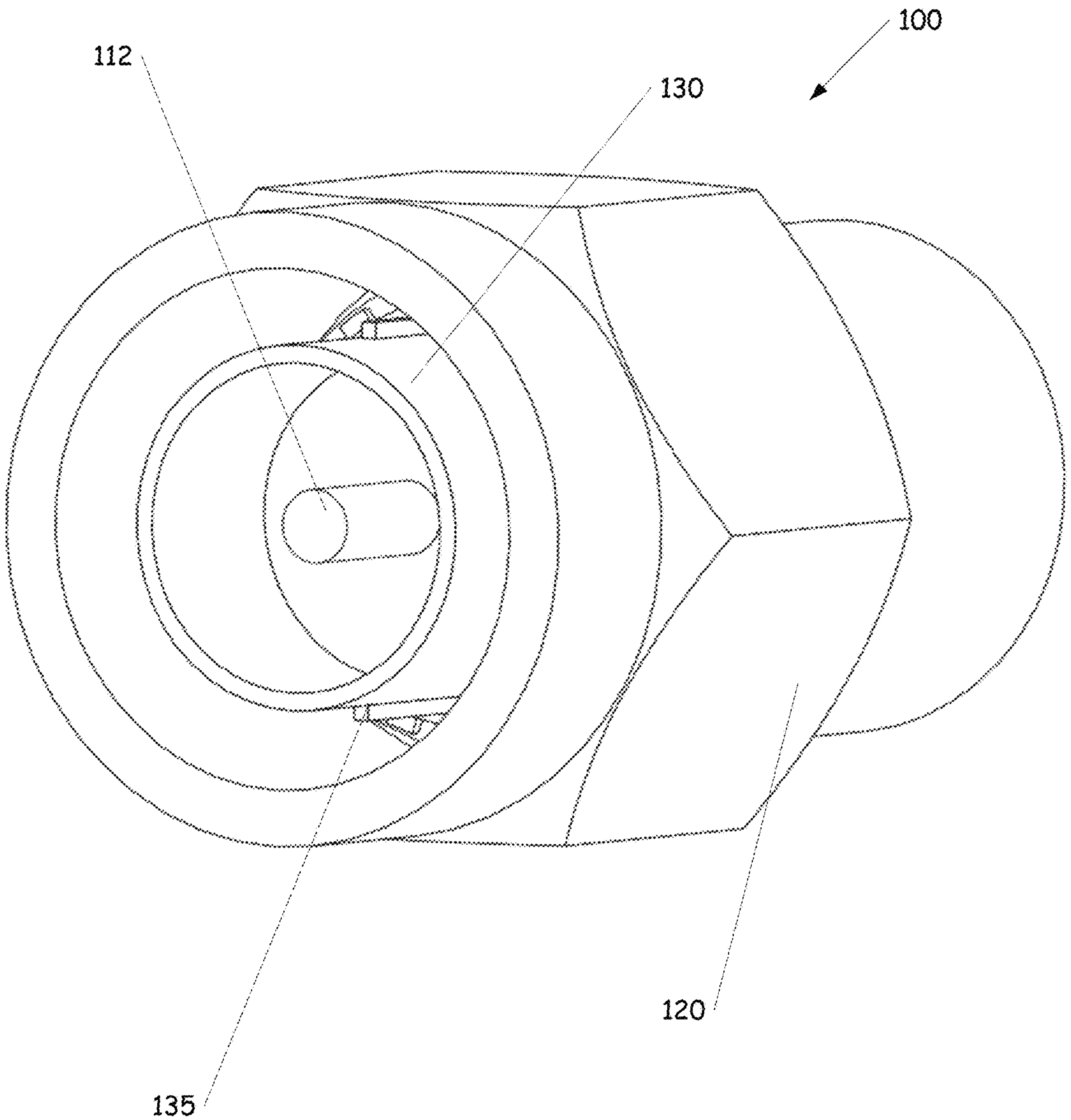
FIG. 7 is a second perspective view of the cable connector in the blocking position according to embodiments of the present disclosure.
Figure 8:
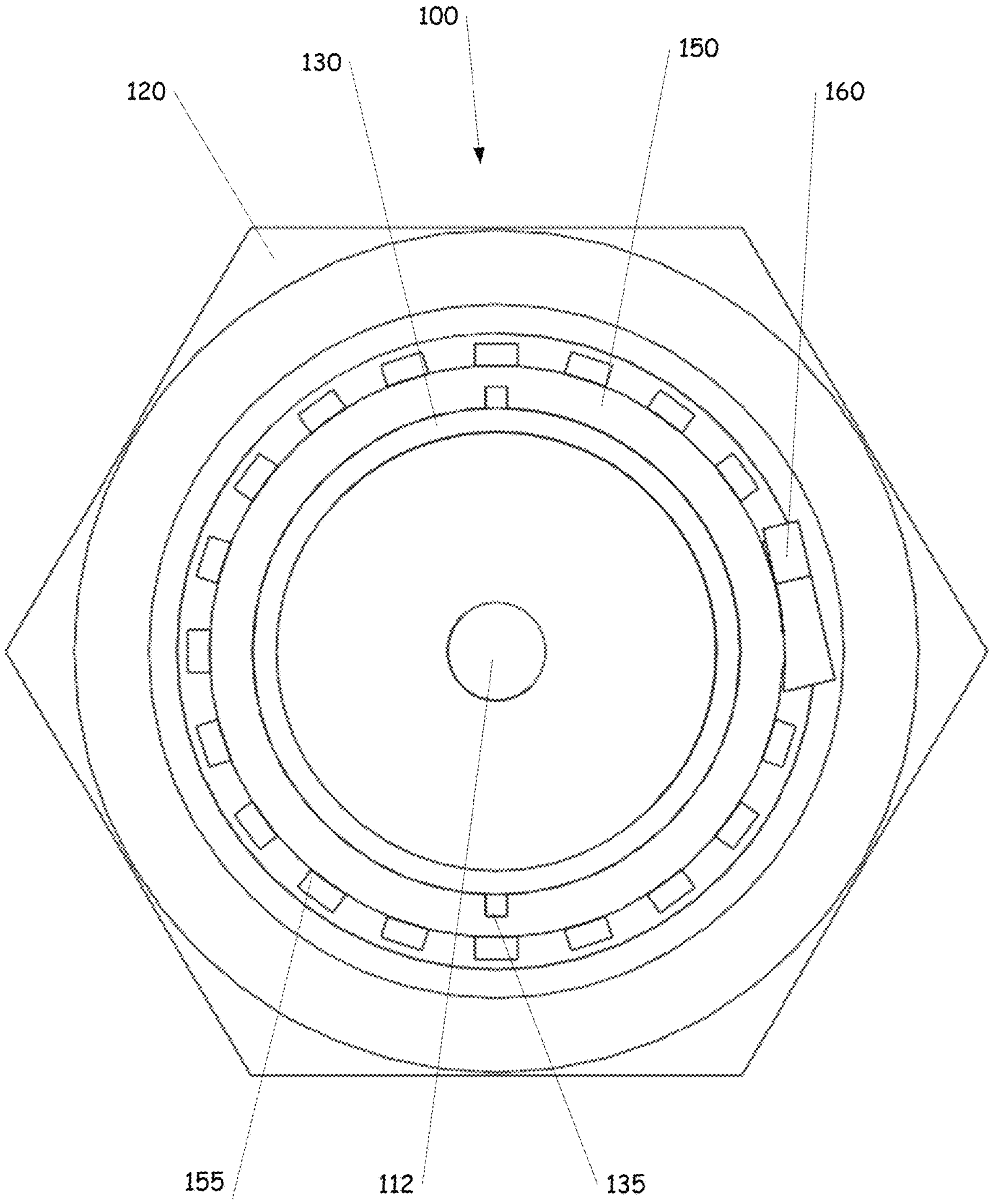
FIG. 8 is a view of the cable connector perpendicular to the bottom surface of the cable connector when in the blocking position.
Figure 9:
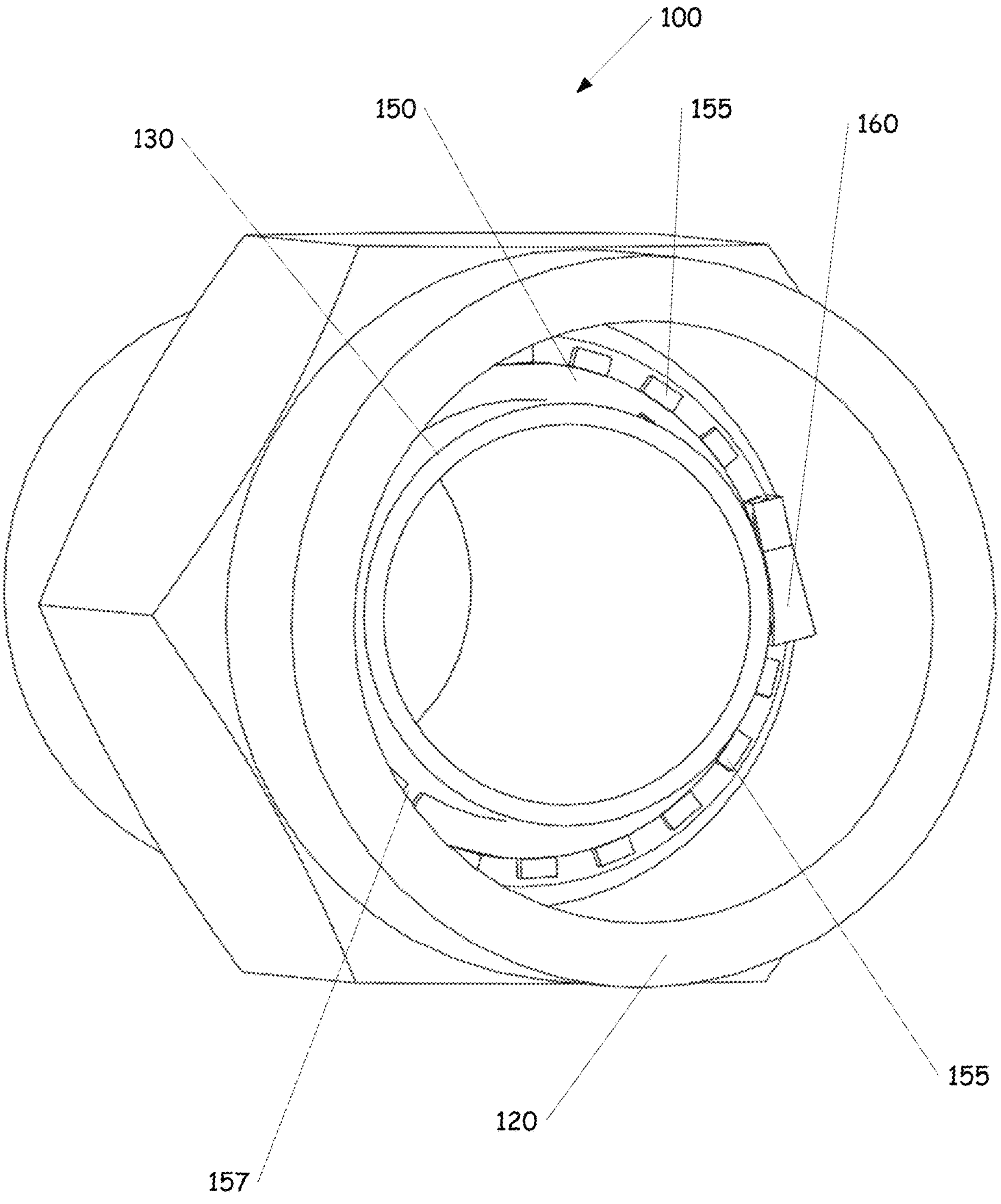
FIG. 9 is a perspective view of the cable connector with the cable removed.
Figure 10:
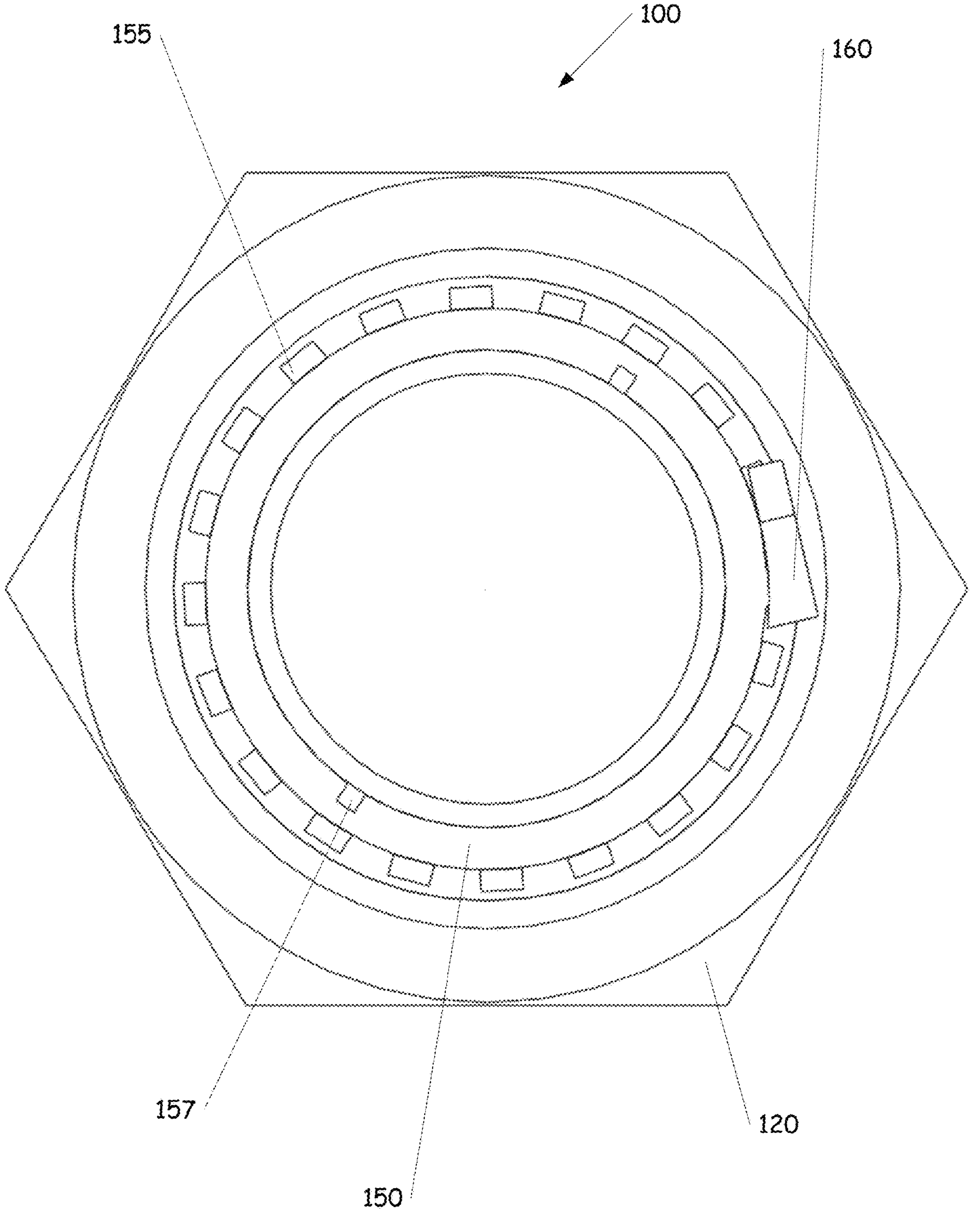
FIG. 10 is a view of the cable connector perpendicular to the bottom surface of the cable connector in the retracted position and the cable removed.
Figure 11:
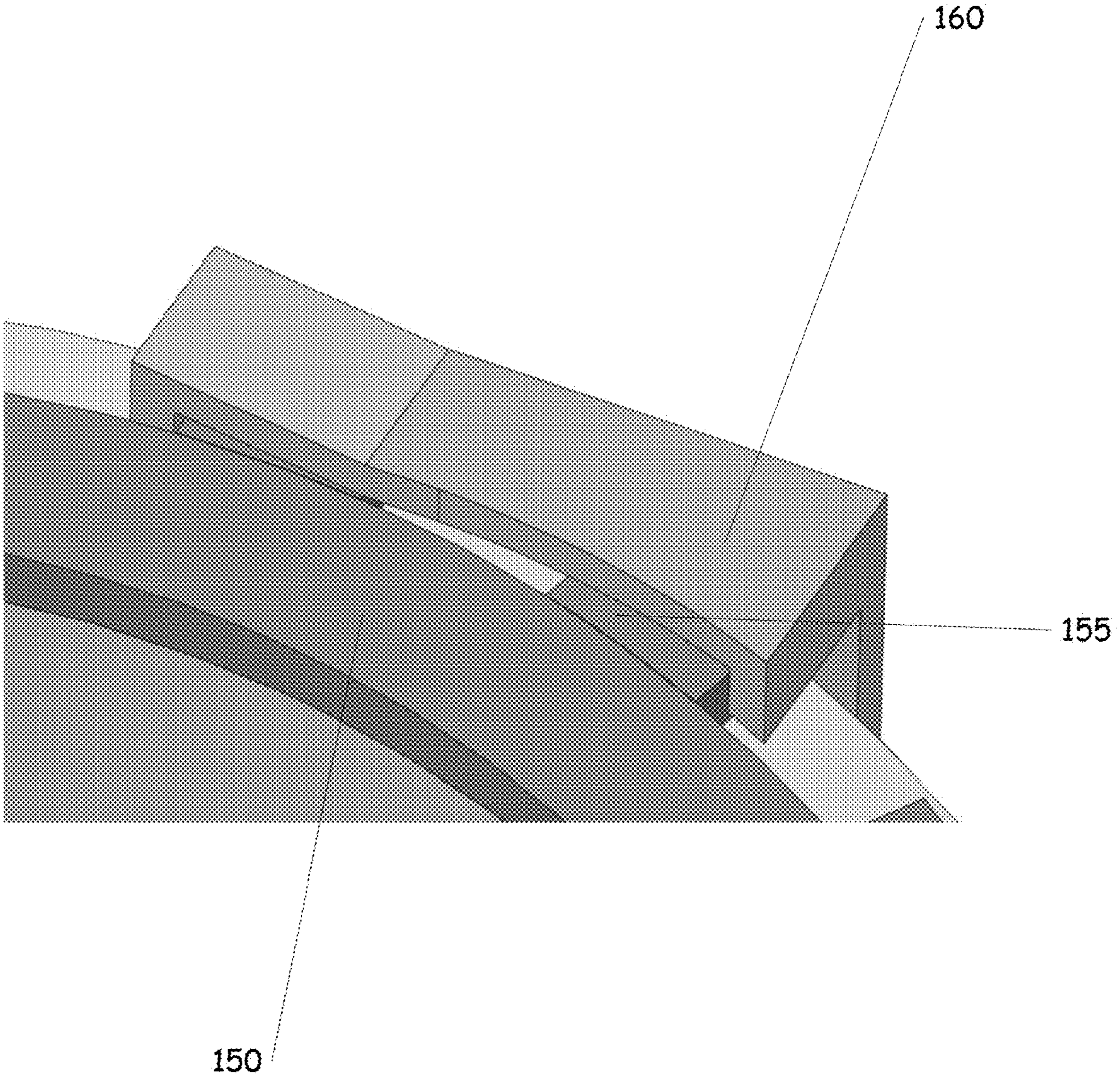
FIG. 11 is a close-up view of the toggle plug according to embodiments of the present disclosure.

FIG. 1 is a cross-sectional view of a cable connector in the retracted position according to embodiments of the present disclosure. FIG. 2 is a cross-sectional view of the cable connector in the blocking position according to embodiments of the present disclosure. FIG. 3 is a simplified cross-sectional view of the cable connector in the retracted position, with the outer sleeve removed, according to embodiments of the present disclosure. FIG. 4 is a simplified cross-sectional view of the cable connector in the blocking position, with the outer sleeve removed, according to embodiments of the present disclosure. FIG. 5 is a perspective view of the cable connector in the retracted position according to embodiments of the present disclosure. FIG. 6 is a perspective view of the cable connector in the blocking position according to embodiments of the present disclosure. FIG. 7 is a second perspective view of the cable connector in the blocking position according to embodiments of the present disclosure. FIG. 8 is a view of the cable connector perpendicular to the bottom surface of the cable connector when in the blocking position. FIG. 9 is a perspective view of the cable connector with the cable removed. FIG. 10 is a view of the cable connector perpendicular to the bottom surface of the cable connector in the retracted position and the cable removed. FIG. 11 is a close-up view of the toggle plug according to embodiments of the present disclosure. For purposes of this discussion FIGS. 1-11 will be discussed together.

The cable connector 100 is a device that is configured to permit a cable 110 to be plugged into a receiving portion of another component (not illustrated). For example, the cable can plug-into a server, a circuit board, or any other component which requires cabling. In the figures the cable is represented by element. The cable 110 includes a center conductor 112 and cable insulation 115. It should be noted that the any type of cable can be placed in the cable connector 100 depending on the specific use of the cable. Further, in some embodiments the cable can have a two cable connectors 100 where each of the cable connectors is disposed at opposite ends of the cable 110.

The cable connector 100 includes an outer sleeve 120, an inner connector sleeve 130, an inner connector sleeve 130 compression spring, a gear wheel 150 and a toggle plug counter 160. The outer connector sleeve is the portion of the cable connector 100 that is configured to interface with the receiving end of a card or other component of a computer system. In some embodiments the outer connector sleeve includes features that permit the cable connector 100 to remain fixably attached to the receiving end. This can include for example, pressure fittings, threaded connections, snaps, clips, etc.

The inner connector sleeve 130 is a portion of the cable connector 100 that is configured to move forward along the outer connector sleeve when the cable connector 100 has reached a predetermined plug count. Further, in some embodiments, the inner connector sleeve 130 is designed to slide along an outer surface of a cable. However, in some embodiments, the connector can include a middle sleeve 140. The middle sleeve 140 can be disposed between the outer sleeve 120 and the inner connector sleeve 130. This can be done for example, to allow for the outer sleeve 120 to be rotated to engage with the receiving end. In other embodiments, the inner connector sleeve 130 can be next to a second inner connector sleeve. In this embodiment the inner connector sleeve 130 is disposed between the outer sleeve 120 and the second inner connector sleeve. The inner connector sleeve 130 would then slide or move between both the outer sleeve 120 and the second inner connector sleeve. The second inner connector sleeve can be provided in instances where the outer surface of the cable does not permit the easy movement of the sleeve against its surface. In yet other embodiment, both the middle sleeve 140 and the second inner connector sleeve can be present. Further, the inner connector sleeve 130 is provided with a sleeve notch 136, such as illustrated in FIG. 4, or other feature so as to prevent the inner connector sleeve 130 from detaching from the cable connector 100. In some embodiments, the sleeve notch 136 includes features to prevent the inner connector sleeve 130 from moving backwards in response to an attempted plugging event.

For example, as illustrated in FIG. 5, the gear wheel 150 is a portion of the cable connector 100 that is configured to rotate in response to each plugin event. The gear wheel 150 is disposed within the outer sleeve 120 and at a point where the gear wheel 150 is proximate to the top portion of the receiving end of the component being plugged into. The gear wheel 150 includes a specific number of teeth 155 that represent the number of plugin cycles that can be performed using this particular cable connector 100. The gear wheel 150 has an inner diameter that is sized such that inner sleeve can pass through the gear wheel 150 when a plug count limit has been reached. The gear wheel 150 includes at least one notch 157 in the wheel, as illustrated in FIG. 6. The notch 157 is located on an inner portion of the wheel opposite from the teeth 155. The at least one notch 157 is sized such that a tab 135 on the inner connector sleeve 130 is capable of passing through the gear wheel 150 when the notch 157 and tab 135 are aligned. However, in some embodiments a portion of the tab 135 extends further than the notch 157 such that this portion contacts the gear wheel and prevents further extension of the inner sleeve 130. (e.g., this portion of the tab is larger than the diameter of the gear wheel notch, or this portion of the tab is wider than the width of the notch). When the tab 135 and notch 157 are not in alignment, the gear wheel 150 acts to block the inner connector sleeve 130 from moving towards the blocking position. When two or more notches are provided on the gear wheel 150, the number of teeth 155 on the gear wheel 150 would increase by the number of notches to achieve the same number of plugin events as when there was just a single notch 157. (e.g., if there are 2 notches, then the number of teeth 155 would double. Such that there are the same number of teeth 155 between both of the notches 157). However, in other embodiments instead of adding teeth 155 around the gear wheel 150 to accommodate the additional notches, the gear wheel 150 can have teeth 155 only in a portion of the wheel, while the rest of the wheel is smooth.

With reference to FIGS. 5 and 6, the toggle plug counter 160 is component of the cable connector 100 that advances the gear wheel 150 one tooth in response to a plugin event. The toggle plug counter 160 is actuated during cable insertion and then upon removal spring action locks it back into place. The toggle plug counter 160 can be shaped such that the portion of the toggle plug counter 160 that is in contact with the wheel is configured to cause the rotation of the gear wheel 150. For example, the toggle plug counter 160 can have a component that bevels in such a way as to push the gear wheel 150 forward one tooth. A portion of the toggle plug counter 160 would block movement of the wheel more than one tooth when the inserted, and a second portion would block movement of the wheel in the forward direction when the cable was not inserted. In some embodiments, instead of the toggle plug counter 160 itself advancing the gear wheel 150, a spring or other mechanism can be provided to consistently push on the gear wheel 150. In this embodiment the toggle plug counter 160 uses the two portions to control the movement of the gear wheel 150. For example, the plugging event would cause the first portion to toggle downward, while the second portion would move upward and release its blocking function. In response the spring would cause the wheel to rotate until the next tooth contacted the first portion. When removed the spring action of the toggle plug counter 160 would cause the second portion to move to the blocking position.

For example, as illustrated in FIG. 6, the inner connector sleeve 130 includes a tab 135 or other component that presses against a portion of the gear wheel 150. This tab 135 keeps the inner connector sleeve 130 in the pluggable position until such time as the gear wheel 150 rotates into a position whereby the tab 135 can pass through the notch 157 of the gear wheel 150. In some embodiments the outer sleeve 120 or middle sleeve 140 include tracks or other features that permit the tab 135 to travel through the outer sleeve 120. In this way the outer sleeve 120 can prevent rotation of the inner sleeve 130 when the gear wheel 150 rotates. This track can also allow for a tighter fitting between the outer sleeve 120 and the inner sleeve 130. In some embodiments a portion of the tab 135 is configured to expand towards the outer sleeve when that portion of the tab 135 passes through the notch 157. By popping up, this portion can prevent the inner sleeve 130 from retracting back into the cable connector.

The inner connector sleeve compression spring or inner spring 170 is a portion of the cable connector 100 that is designed to push the inner connector sleeve 130 forward into a blocking position. The inner spring 170 is disposed at an opposite end of the inner connector sleeve 130 from where the cable interfaces with the receiving end. A portion of the outer sleeve 120 provides a compression surface for the inner spring 170, while the rear portion of the inner connector sleeve 130 provides the counter portion of the compression surface such that the spring is in a compressed or loaded position when the inner connector sleeve 130 is in a pluggable position. When the gear wheel 150 rotates to a position whereby the tab 135 of the inner connector sleeve 130 can pass through the gear wheel 150, the inner spring 170 decompresses and pushes the inner connector sleeve 130 through the gear wheel 150 and places the inner connector sleeve 130 in a position that prevents the cable connector 100 from plugging into the receiving end. In some embodiments, inner spring 170 has a diameter just greater than that of the cable insulation. In some embodiments the inner spring 170 has a spring force that is sufficient to prevent further plugging. For example, the spring force can be a force sufficient to cause the cable connector 100 to unplug on its own. In another example, the spring force can be a force sufficient that it makes it impossible or nearly impossible for a user to displace the inner connector sleeve 130.

Figure 12:
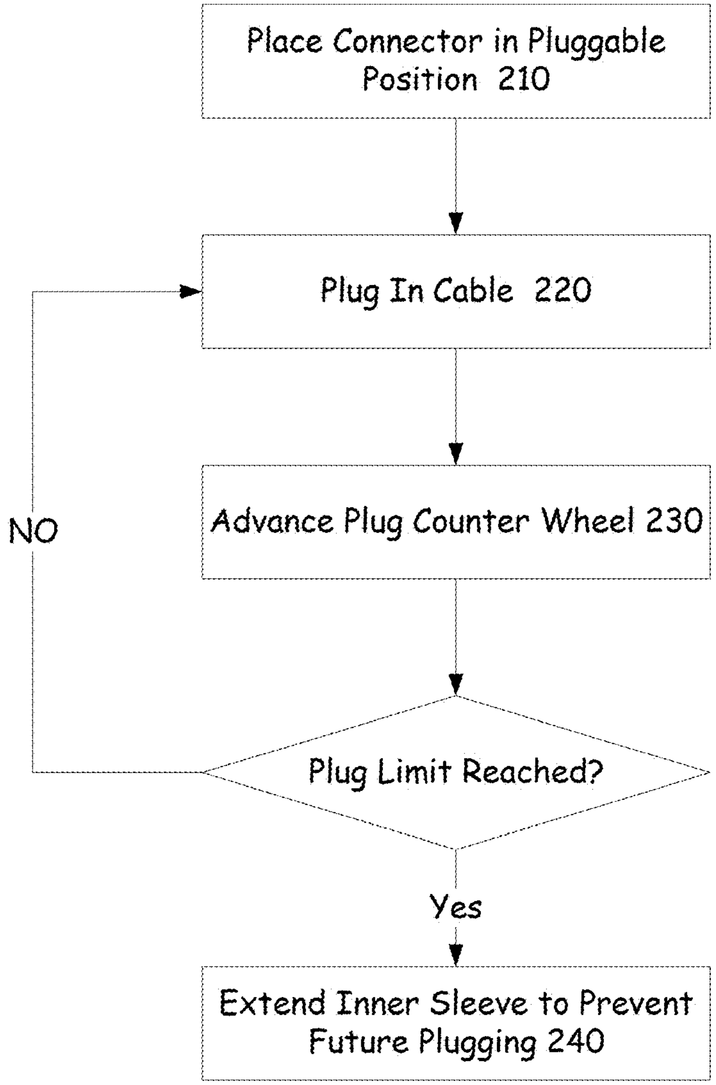
FIG. 12 is a flow chart illustrating a process for mechanically counting mating cycles and preventing additional plugin events after reaching a threshold number of mating cycles according to embodiments of the present disclosure.

FIG. 12 is a flow chart illustrating a process for mechanically counting mating cycles and preventing additional plugin events after reaching a threshold number of mating cycles according to embodiments of the present disclosure. Prior to reaching the mating cycle limit the SMA connector inner sleeve 130 is in a retracted position and the compression spring 170 is compressed against a spring stop. This is illustrated at step 210 The cable is inserted into the SMA connector. This is illustrated at step 220. When a cable is inserted into the SMA connector 100 it engages the toggle plug counter 160 which engages the keyed gear wheel 150 resulting in a rotation of one gear tooth 155 which represents a single plug action. This is illustrated at step 230. The toggle plug counter 160 is also, in some embodiments, spring activated and when a cable is disconnected from the SMA the toggle plug counter disengages from the gear wheel via the toggle plug counter spring. Both the inner connector sleeve 130 and the gear wheel 150 are keyed such that when rotation of the gear wheel 150 results in alignment of the tab 135 and the notch 157 the inner connector sleeve 130 is protracted by the inner spring 170 preventing additional cable mating to the SMA connector. This is illustrated at step 240.

The present disclosure can be considered as well in view of the following clauses.

1. A cable connector comprising, an outer sleeve, an inner sleeve, a gear wheel, a toggle plug connector and an inner spring. The inner sleeve is disposed inside the outer sleeve, the inner sleeve is configured to move relative to the outer sleeve. The inner sleeve also includes a tab on an outer surface of the inner sleeve. The gear is wheel disposed inside the outer sleeve and perpendicular to the inner sleeve. The gear wheel includes a number of gear teeth permitting rotation of the gear wheel. The gear wheel prevents the inner sleeve from moving until the tab of the inner sleeve aligns with a notch in the gear wheel. The toggle plug counter interacts with the plurality of gear teeth on the gear wheel. The toggle plug counter rotates the gear wheel one tooth in response to a plug-in action of the cable connector. The inner spring is placed at the end of the inner sleeve opposite the gear wheel, and causes the inner sleeve to move through the gear wheel when the tab of the inner sleeve and the notch in the gear wheel are aligned.

2. The cable connector of clause 1 further having a middle sleeve between the inner sleeve and the outer sleeve such that the inner sleeve can move relative to the middle sleeve.

3. The cable connector of clauses 1 or 2 wherein the outer sleeve includes a track to permit the tab of the inner sleeve to move through the outer sleeve.

4. The cable connector of any of the preceding clauses wherein the plurality of teeth equal a number equal to a desired threshold number of plug-in events for the cable connector.

5. The cable connector of any of the preceding clauses wherein the gear wheel has a second notch and the inner sleeve has a second tab. As such the number of teeth between the notch and the second notch is equal to a number equal to a desire threshold number of plug-in events for the cable connector.

6. The cable connector of any of the preceding clauses wherein the toggle plug counter further includes a spring configured to cause the gear wheel to advance one tooth.

7. The cable connector of any of the preceding clauses wherein the tab of the inner sleeve includes a portion that is larger than the notch at a location along the tab that when the inner sleeve is moved through the gear wheel the end opposite the inner spring prevents connection of the cable connector.

8. The cable connector of any of the preceding clauses wherein the inner sleeve includes at least one feature to prevent the inner sleeve from moving in a direction towards the inner spring.

9. The cable connector of any of the preceding clauses wherein a portion of the tab is configured to expand towards the outer sleeve in response to the inner sleeve passing through the notch.

10. The cable connector of any of the preceding clauses wherein at least one feature is a sleeve notch.

11. The cable connector of any of the preceding clauses wherein the inner spring has a spring force that is sufficient to cause the cable connector to detach from a connection.

12. The cable connector of any of the preceding clauses further including a cable disposed within the cable connector.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A cable connector comprising:
- an outer sleeve;
- an inner sleeve disposed inside the outer sleeve, the inner sleeve configured to move relative to the outer sleeve, the inner sleeve further including a tab on an outer surface of the inner sleeve;
- a gear wheel disposed inside the outer sleeve and perpendicular to the inner sleeve, the gear wheel having a plurality of gear teeth, the gear wheel configured to prevent the inner sleeve from moving until the tab of the inner sleeve aligns with a notch in the gear wheel;
- a toggle plug counter configured to interact with the plurality of gear teeth on the gear wheel, the toggle plug counter configured to rotate the gear wheel one tooth in response to a plug-in action of the cable connector;
- an inner spring disposed at an end of the inner sleeve opposite the gear wheel, the inner spring configured to cause the inner sleeve to move through the gear wheel in response to alignment of the tab of the inner sleeve and the notch in the gear wheel.

2. The cable connector of claim 1 further comprising:
- a middle sleeve, the middle sleeve disposed between the inner sleeve and the outer sleeve; and
- wherein the inner sleeve is configured to move relative to the middle sleeve.

3. The cable connector of claim 1 wherein the outer sleeve includes a track to permit the tab of the inner sleeve to move through the outer sleeve.

4. The cable connector of claim 1 wherein the plurality of teeth equal a number equal to a desired threshold number of plug-in events for the cable connector.

5. The cable connector of claim 1 wherein the gear wheel has a second notch and the inner sleeve has a second tab; and
- wherein a number of teeth between the notch and the second notch is equal to a number equal to a desire threshold number of plug-in events for the cable connector.

6. The cable connector of claim 1 wherein the toggle plug counter further includes a spring configured to cause the gear wheel to advance one tooth.

7. The cable connector of claim 1 wherein the tab of the inner sleeve includes a portion that is larger than the notch disposed at a location along the tab that when the inner sleeve is moved through the gear wheel the end opposite the inner spring prevents connection of the cable connector.

8. The cable connector of claim 1 wherein the inner sleeve includes at least one feature to prevent the inner sleeve from moving in a direction towards the inner spring.

9. The cable connector of claim 8 wherein a portion of the tab is configured to expand towards the outer sleeve in response to the inner sleeve passing through the notch.

10. The cable connector of claim 8 wherein the at least one feature is a sleeve notch.

11. The cable connector of claim 1 wherein the inner spring has a spring force that is sufficient to cause the cable connector to detach from a connection.

12. A cable system comprising:
- a cable including a center conductor and cable insulation;
- a cable connector disposed at a first end of the cable, the cable connector having;
  - an outer sleeve;
  - an inner sleeve disposed inside the outer sleeve, the inner sleeve configured to move relative to the outer sleeve, the inner sleeve further including a tab on an outer surface of the inner sleeve;
  - a gear wheel disposed inside the outer sleeve and perpendicular to the inner sleeve, the gear wheel having a plurality of gear teeth, the gear wheel configured to prevent the inner sleeve from moving until the tab of the inner sleeve aligns with a notch in the gear wheel;
  - a toggle plug counter configured to interact with the plurality of gear teeth on the gear wheel, the toggle plug counter configured to rotate the gear wheel one tooth in response to a plug-in action of the cable connector;
  - an inner spring disposed at an end of the inner sleeve opposite the gear wheel, the inner spring configured to cause the inner sleeve to move through the gear wheel in response to alignment of the tab of the inner sleeve and the notch in the gear wheel.

13. The cable system of claim 12 wherein the cable connector further comprising:
- a middle sleeve, the middle sleeve disposed between the inner sleeve and the outer sleeve; and
- wherein the inner sleeve is configured to move relative to the middle sleeve.

14. The cable system of claim 12 wherein the outer sleeve includes a track to permit the tab of the inner sleeve to move through the outer sleeve.

15. The cable system of claim 12 wherein the plurality of teeth equal a number equal to a desired threshold number of plug-in events for the cable connector.

16. The cable system of claim 12 wherein the gear wheel has a second notch and the inner sleeve has a second tab; and
- wherein a number of teeth between the notch and the second notch is equal to a number equal to a desire threshold number of plug-in events for the cable connector.

17. The cable system of claim 12 wherein the toggle plug counter further includes a spring configured to cause the gear wheel to advance one tooth.

18. The cable system of claim 12 wherein the tab of the inner sleeve includes a portion that is larger than the notch disposed at a location along the tab that when the inner sleeve is moved through the gear wheel the end opposite the inner spring prevents connection of the cable connector.

19. The cable system of claim 12 wherein the inner sleeve includes at least one feature to prevent the inner sleeve from moving in a direction towards the inner spring.

20. The cable system of claim 12 wherein the cable connector further comprising:

a second cable connector disposed at a second end of the cable, the cable connector having;
an outer sleeve;
an inner sleeve disposed inside the outer sleeve, the inner sleeve configured to move relative to the outer sleeve, the inner sleeve further including a tab on an outer surface of the inner sleeve;
a gear wheel disposed inside the outer sleeve and perpendicular to the inner sleeve, the gear wheel having a plurality of gear teeth, the gear wheel configured to prevent the inner sleeve from moving until the tab of the inner sleeve aligns with a notch in the gear wheel;
a toggle plug counter configured to interact with the plurality of gear teeth on the gear wheel, the toggle plug counter configured to rotate the gear wheel one tooth in response to a plug-in action of the cable connector;
an inner spring disposed at an end of the inner sleeve opposite the gear wheel, the inner spring configured to cause the inner sleeve to move through the gear wheel in response to alignment of the tab of the inner sleeve and the notch in the gear wheel.

* * * * *